US012638738B2

(12) United States Patent
Bjornard et al.

(10) Patent No.: US 12,638,738 B2
(45) Date of Patent: May 26, 2026

(54) COUNTER ELECTRODE FOR AN ELECTROCHROMIC DEVICE

(71) Applicant: Apple Inc., Cupertino, CA (US)

(72) Inventors: Erik J. Bjornard, San Jose, CA (US); Tingjun Xu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 670 days.

(21) Appl. No.: 17/902,869

(22) Filed: Sep. 4, 2022

(65) Prior Publication Data

US 2023/0070931 A1     Mar. 9, 2023

Related U.S. Application Data

(60) Provisional application No. 63/241,398, filed on Sep. 7, 2021.

(51) Int. Cl.
*G02F 1/1524* (2019.01)
*G02F 1/155* (2006.01)
*G03B 9/02* (2021.01)

(52) U.S. Cl.
CPC .... *G02F 1/1524* (2019.01); *G02F 2001/1555* (2013.01); *G03B 9/02* (2013.01)

(58) Field of Classification Search
CPC .. G02F 1/1524; G02F 2001/1555; G03B 9/02
See application file for complete search history.

(56) References Cited

U.S. PATENT DOCUMENTS 4,200,372 A     4/1980    Iwama et al.
6,667,471 B2    12/2003   Bos et al.

| | | |
|---|---|---|
| 6,963,437 B2 | 11/2005 | Bauer et al. |
| 8,780,432 B1 | 7/2014 | Nguyen |
| 9,307,158 B2 | 4/2016 | Gleason et al. |
| 9,360,730 B2 | 6/2016 | Shi |
| 9,759,984 B1 | 9/2017 | Xu et al. |
| 9,817,213 B2 | 11/2017 | Mercado |
| 10,359,679 B2 | 7/2019 | Trajkovska-Broach et al. |
| 10,429,711 B2 | 10/2019 | Luten et al. |
| 10,585,322 B2 | 3/2020 | Gil et al. |
| 2006/0110580 A1 | 5/2006 | Aylward et al. |
| 2006/0209383 A1* | 9/2006 | Burdis .................... G02F 1/155 |
| | | 359/265 |
| 2010/0261067 A1* | 10/2010 | Pitts ........................ H01M 4/13 |
| | | 29/623.5 |
| 2011/0151283 A1* | 6/2011 | Gillaspie ............... H01M 4/505 |
| | | 429/188 |
| 2013/0186177 A1 | 7/2013 | Palazzotto et al. |
| 2016/0091768 A1 | 3/2016 | Gleason et al. |

(Continued)

FOREIGN PATENT DOCUMENTS

WO       WO 16/048600        3/2016

*Primary Examiner* — George G. King

(74) *Attorney, Agent, or Firm* — Brownstein Hyatt Farber Schreck, LLP

(57)        ABSTRACT

An imaging system for a portable electronic device includes a variable aperture between a lens group and an image sensor. The variable aperture is defined by an electrochromic stack that defines a switching region and a central non-switching region. The electrochromic stack is defined by a layer of electrochromic material in which an electrochromic crystallite dispersion (e.g., nickel oxide) is suspended in a field of a lithiated ion conductor layer (e.g., lithiated tungsten nickel oxide).

14 Claims, 9 Drawing Sheets

500a

(56) References Cited

U.S. PATENT DOCUMENTS

| | | | |
|---|---|---|---|
| 2016/0209722 A1* | 7/2016 | Wang ................. | C23C 14/0036 |
| 2017/0003564 A1* | 1/2017 | Gillaspie ............... | B23K 20/10 |
| 2017/0357135 A1* | 12/2017 | Gillaspie .............. | G02F 1/1524 |
| 2018/0252946 A1 | 9/2018 | Chandrasekhar et al. | |
| 2019/0023981 A1 | 1/2019 | Van Der Boom et al. | |
| 2019/0353971 A1 | 11/2019 | Kubo | |
| 2020/0050072 A1* | 2/2020 | Kozlowski ............. | C23C 10/28 |
| 2020/0357880 A1 | 11/2020 | Xu et al. | |
| 2021/0124229 A1 | 4/2021 | Oesterschulze et al. | |
| 2022/0308416 A1* | 9/2022 | Rozbicki ............... | G02F 1/1524 |
| 2023/0091326 A1 | 3/2023 | Bjornard et al. | |
| 2023/0093313 A1 | 3/2023 | Bjornard et al. | |

* cited by examiner

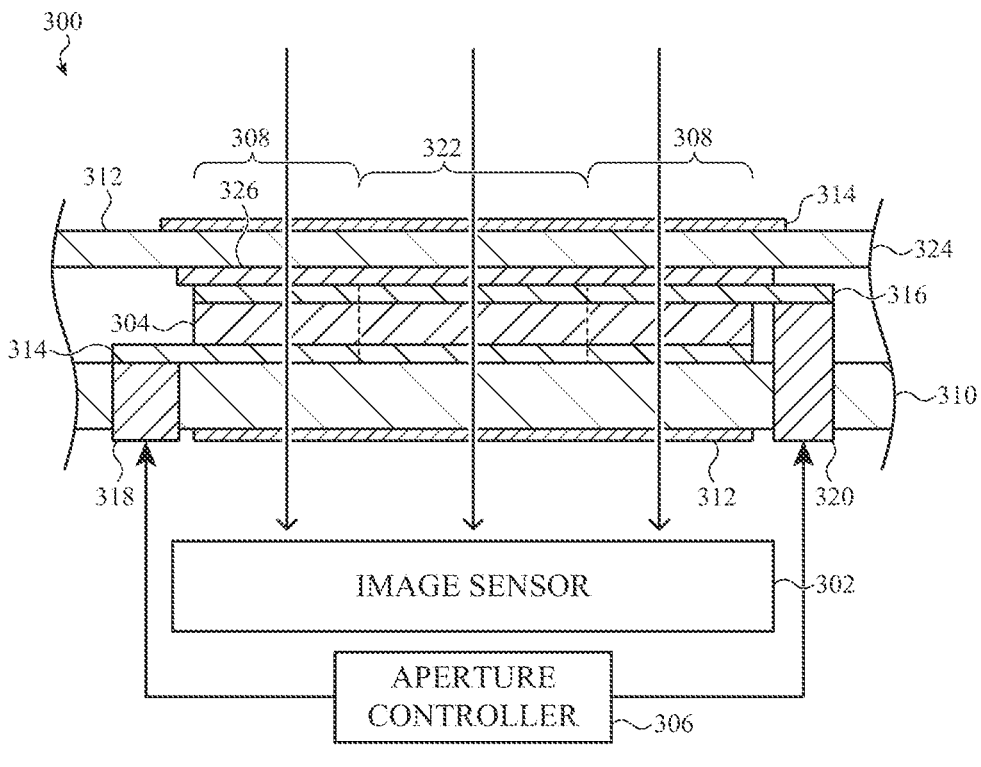
*FIG. 3A*
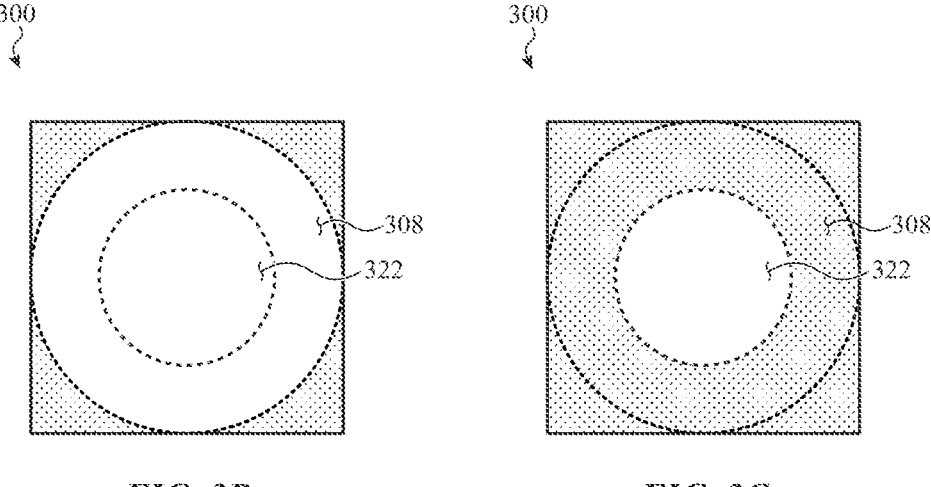
*FIG. 3B*                    *FIG. 3C*

500a

500b

SET MATERIAL A AND MATERIAL B DEPOSITION RATE ~602

SET ROTATION RATE OF PLANETARY DEPOSITION BASE ~604

PROCESSED TO DESIRED ELECTROCHROMIC STACK HEIGHT ~606

ANNEAL MULTILAYER STACK TO FORM CRYSTALLITE DISPERSION ~608

700

SET MATERIAL A, MATERIAL B,
DEPOSITION RATE, AND TEMP          ⌐702

SET ROTATION RATE OF
PLANETARY DEPOSITION BASE          ⌐704

PROCESSED TO DESIRED
ELECTROCHROMIC STACK HEIGHT        ⌐706

COUNTER ELECTRODE FOR AN ELECTROCHROMIC DEVICE

CROSS-REFERENCE TO RELATED APPLICATION(S)

This application is a nonprovisional of, and claims the benefit under 35 U.S.C. § 119 of, U.S. Provisional Patent Application No. 63/241,398, filed on Sep. 7, 2021, and entitled "Systems and Methods for Manufacturing a Controllable Aperture for a Portable Electronic Device Imaging System," the contents of which is incorporated by reference in its entirety.

TECHNICAL FIELD

Embodiments described herein relate to imaging systems for portable electronic devices and, in particular, to systems and methods for manufacturing a counter electrode of an electrically-controllable aperture layer positioned above an image sensor of an imaging system of a portable electronic device.

BACKGROUND

An electronic device may include an imaging system for capturing an image of a scene. A conventional imaging system includes an image sensor aligned with a focal plane defined by a configuration of lens elements, referred to as a lens group. The imaging system can also include an aperture positioned between the lens group and the image sensor that limits light exposed to the image sensor.

Certain electronic devices, such as portable electronic devices, are often designed specifically to minimize device profile. As a result, portable electronic devices incorporating imaging systems typically include a fixed aperture, which may not be optimally sized for imaging all scenes. Some electronic devices include a variable aperture, for example an electrochromic aperture. However, conventional methods of manufacturing electrochromic apertures introduce undesirable imaging effects, such as phase distortion, high absorption, and clouding.

SUMMARY

Embodiments described herein can take the form of an imaging system for a portable electronic device. The imaging system, also referred to as a camera system, can include a switchable aperture. The switchable aperture, as described herein, can leverage an electrochromic property of an electrochromic material disposed onto a transparent substrate such as glass to define a bleached (transparent) state and a colored (opaque) state of that substrate.

More generally, the switchable aperture as described herein includes a transparent substrate that defines a non-switching region and a switching region. When a suitable voltage is applied to the switching region, the switching region can transition from the bleached state to the colored state, or from the colored state to the bleached state. In many cases, the non-switching region has a circular shape and is located in a geometric center of the substrate. In this construction, the switching region circumscribes the non-switching region.

As a result of this architecture, if the switching region is in a colored state, light can only pass through the circular non-switching region defining an imaging aperture having a diameter defined by the diameter of the circular non-switching region. If the switching region is in a bleached state, however, light can pass through both the switching region and the non-switching region, thereby defining an imaging aperture with a diameter bigger than the non-switching region.

An electrochromic material as described herein, also referred to as an electrochromic layer, includes a counter electrode that facilitates charge carrier movement to induce an electrochromic effect. The counter electrode of embodiments described herein is defined by a dispersion of crystallites of a transition metal oxide (e.g., nickel oxide) suspended within a field of a lithiated second transition metal oxide, such as a lithiated tungsten oxide or a lithiated tantalum oxide. In these constructions each transition metal crystallite has a diameter (or other primary geometric dimension) of approximately 5 nm. In some cases, larger crystallites may be defined, whereas in others, smaller crystallites may be defined. The average distance between crystallites (also referred to as the density of the crystallites) may also vary from embodiment to embodiment, and may be selected and/or controlled for in manufacturing.

Many embodiments described herein reference systems and methods for manufacturing a counter electrode as described above. In particular, many embodiments are focused to manufacturing an anneal precursor stack defining at least a portion of an electrochromic layer of an imaging system in a portable electronic device. As used herein the term/phrase "anneal precursor" may refer to a component, construction, material, or stack of materials assembled or disposed prior to annealing thereof. In other words, an anneal precursor is an component manufactured prior to annealing.

For certain embodiments described herein, an anneal precursor stack includes an optically transparent substrate, a metal oxide layer disposed onto the optically transparent substrate, and a precursor layer disposed onto the metal oxide layer to a first thickness. The metal oxide may be formed from indium tin oxide, and the optically transparent substrate may be formed from a silica glass.

The precursor layer, once annealed, defines an electrochromic counter electrode of the electrochromic layer of the imaging system.

The precursor layer of such embodiments is defined by a lithiated transition metal oxide stack comprising alternating layers of a first transition metal oxide and a second transition metal oxide. At least one of these two transition meal oxide layers can be implanted with lithium ions using a suitable technique. The thickness of each successive alternating layer can be the same, different, or may vary on a gradient or according to some predefined pattern. In many cases, the layers of the first and second transition metal oxides may be nanoscale, on the order of 0.1 nm to 1.5 nm.

As a result of this nanolayer construction, once subjected to annealing conditions, the transition metal oxides can conglomerate to form crystallites, such as described above. A person of skill in the art may readily appreciate that by varying annealing conditions, different annealing properties and/or crystallite sizes can be achieved. In other words, an anneal plan (temperature curves, pressure curves, time in oven and so on) may vary from embodiment to embodiment.

Additional embodiments described herein take the form of a method of forming an anneal precursor stack and a counter electrode of an electrochromic layer of an imaging system in a portable electronic device, the method including the operations of: forming an anneal precursor stack by (1) selecting an optically transparent substrate, (2) disposing a first metal oxide layer onto a surface of the optically transparent substrate, (3) forming a precursor layer, to a first thickness, over the metal oxide layer by alternatingly disposing a second thickness of a first transition metal oxide over an uppermost layer of the precursor layer, and a third thickness of a second transition metal oxide over the uppermost layer of the precursor layer. In this construction, at least one of the first transition metal oxide or the second transition metal oxide are implanted with lithium ions to a selected concentration. In other cases, lithium deposition may not be required.

Once the anneal precursor stack is formed, the method advances to annealing. In particular, the anneal precursor stack is annealed according to an anneal plan to cause the precursor layer to define a counter electrode with a diffusion of crystallites of the first transition metal oxide suspended in a field of lithiated second transition metal oxide. Thereafter or prior to annealing, the method may be leveraged to dispose a second metal oxide layer over the counter electrode/anneal precursor stack. Once the second metal oxide layer is disposed, and etch at least one of the first metal oxide layer or the second metal oxide layer to define a switching region and a non-switching region of the counter electrode.

In some examples, forming the precursor layer may be performed at least in part by a planetary deposition process in which the optically transparent substrate is rotated through at least (1) a first deposition region in which the first transition metal oxide may be disposed and (2) a second deposition region in which the second transition metal oxide may be disposed.

In further embodiments, annealing may not be required. For example, in some cases, a multilayer stack as described herein can be manufactured at or near annealing temperatures for one or more transition metal oxides such that, on deposition, crystallites can agglomerate during deposition and/or shortly after deposition. In yet other examples, high temperature deposition may be used prior to annealing, or prior to deposition of one or more subsequent layers of transition metal oxides.

In some cases, lithium ion deposition may not be required and/or may be varied across a dimension of one or more deposited layers of transition metal oxide.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIG. 3A depicts an imaging system component in cross-section that may be used with an imaging system incorporated into an electronic device, such as described herein.

FIG. 3B depicts the imaging system component of FIG. 3A depicting a switching region and a non-switching region operated in a first mode, such as described herein.

FIG. 3C depicts the imaging system component of FIG. 3B operated in a second mode.

The use of the same or similar reference numerals in different figures indicates similar, related, or identical items.

Figure 1A:
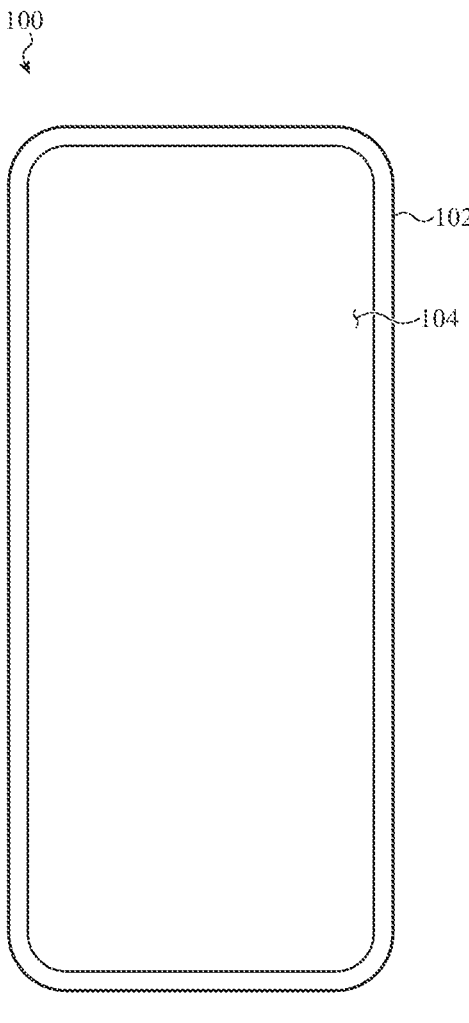
FIG. 1A depicts an example electronic device that can include an imaging system and/or imaging system component, such as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Similarly, certain accompanying figures include vectors, rays, traces and/or other visual representations of one or more example paths—which may include reflections, refractions, diffractions, and so on, through one or more mediums—that may be taken by, or may be presented to represent, one or more photons, wavelets, or other propagating electromagnetic energy originating from, or generated by, one or more light sources shown or, or in some cases, omitted from, the accompanying figures. It is understood that these simplified visual representations of light or, more generally, electromagnetic energy, regardless of spectrum (e.g., ultraviolet, visible light, infrared, and so on), are provided merely to facilitate an understanding of the various embodiments described herein and, accordingly, may not necessarily be presented or illustrated to scale or with angular precision or accuracy, and, as such, are not intended to indicate any preference or requirement for an illustrated embodiment to receive, emit, reflect, refract, focus, and/or diffract light at any particular illustrated angle, orientation, polarization, color, or direction, to the exclusion of other embodiments described or referenced herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to electronically-controllable apertures (or, more simply, a "switchable aperture") with uniform or substantially uniform path length and index of refraction between both switching areas and non-switching areas, thereby among other benefits and improvements substantially mitigating phase distortion effects presented by conventional switching apertures.

In addition, embodiments described herein implement electronically-controllable apertures with improved bleach-state transparency—while maintaining a substantially opaque colored state—due, at least in part, to thinner electrochromic counter electrodes, in turn resulting in a thinner and more transparent electrochromic stack.

In other cases, the transparency of the controllable aperture maybe improved at least in part due to more consistent and/or smaller transition metal crystallite size in the counter electrode; in such examples, the controllable aperture may have increased thickness while also maintaining increased transparency compared to conventional implementations. As a result of increased relative thickness, the controllable aperture may be less fragile than conventional systems and, in some cases, may additionally serve as a more effective protective or structural layer to other portions of an imaging system incorporating the aperture. Furthermore, as a result of reduced-size, transition metal oxide crystallites can be more completely or thoroughly reduced, thereby increasing transparency of the overall stack. A further advantage of embodiments described herein is that due at least in part to reduced crystallite size, charge carrier (e.g., lithium ions) capacity per unit volume may be increased, thereby also improving crystallite reduction efficiency.

An electronically-controllable aperture or switchable aperture as described herein may in some implementations be configured for use with a camera module (which may also be referred to herein as an "imaging system") of a portable electronic device, such as a cellular phone, a wearable device, a tablet device, a laptop device, a personal heads up display device, a video conferencing device, and so on.

In particular, a switchable aperture as described herein can be manufactured such that light passing through the switchable aperture encounters substantially the same overall change in index of refraction along its path through the switchable aperture, regardless whether that path intersects a switching region of the switchable aperture or that path intersects a non-switching region of the switchable aperture. For embodiments described herein, a thickness of the switchable aperture is substantially uniform such that a path length through the switchable aperture is substantially the same for all incident light.

As a result of constructions and manufacturing techniques described herein, a switchable aperture, or other similarly-configured or operated imaging system component, can minimize imaging artifacts, such as (and with particular reference to) phase distortion, that may be imparted by conventional switchable apertures and other conventional switchable or controllable imaging system components.

In particular, many embodiments described herein include an electrochromic stack disposed onto, and/or formed onto, an optically transparent substrate, which may be formed from a material such as a silica glass. The electrochromic stack includes a layer of electrochromic material. The electrochromic material can include any suitable organic or inorganic monolith material or combination of materials (e.g., mixture, amalgam, suspension, multilayer, and so on), including transition metal oxides such as tungsten oxide, molybdenum oxide, iridium oxide, nickel oxide, vanadium oxide, and other metal oxides and alloys thereof. In other cases, organic compounds may be used additionally or in place of a transition metal oxide.

An electrochromic stack as described herein can be implemented in a number of ways. In many implementations, an electrochromic stack includes an electrochromic material, which may also be referred to as a counter electrode. The electrochromic material, in some embodiments, be implemented as a dispersion of crystallites of a first material into a second, lithiated, material.

The size of the crystallites of the electrochromic material and the density of the crystallites of the electrochromic material may be varied from embodiment to embodiment. In some examples, the crystallite material may be a nickel oxide (first material) and the lithiated material (second material) may be lithiated tungsten-nickel oxide or lithiated tantalum-nickel oxide. In one example embodiment, nickel oxide crystallites dispersed within lithiated tungsten-nickel oxide (or lithiated tantalum-nickel oxide) can be approximately 5 nm in diameter and may be distributed to a selected density, or to one or more selected densities that may vary by axis. This is merely one example, and a person of skill in the art may readily appreciate that other embodiments can be implemented with different, implementation specific, target specifications.

As a result of the construction, overall crystallite surface area can be maximized while maintaining an overall thin (and therefore more light-transmissive in a bleached state) which, in turn, can result in faster switching performance.

To manufacture a crystallite dispersion defining a counter electrode as described herein, a base substrate can be eccentrically secured to a planetary deposition apparatus configured to rotate the base substrate around a central axis at a selectable rate. As a result of this construction, the base substrate completes a circular rotation around the central axis at a rate of rotation of the planetary deposition apparatus.

During rotation, the base substrate can be passed below one or more deposition apparatuses, each configured to dispose or otherwise cause to be accumulated a layer of material on the base substrate. The rate of rotation of the planetary deposition apparatus and the rate of deposition by the deposition apparatus can define a layer thickness. More generally, the slower a deposition apparatus is configured to dispose material onto the base substrate, the thinner a layer of deposited material may be. Independently, the faster the planetary deposition apparatus rotates, the thinner a layer of deposited material may be. A person of skill in the art may appreciate that by modifying either or both the deposition rate and/or the rotation speed, any suitable thickness of material may be deposited.

Similarly, it may be appreciated that one or more layer properties or characteristics can be controlled during deposition. For example, temperature of deposition may be controlled, power of the deposition apparatus may be controlled (e.g., which may be correlated to deposition rate), voltage difference between the deposition apparatus and the base substrate may be controlled, and so on. More generally and broadly, it may be appreciated that a number of variables may be controlled and/or selected in order to dispose a layer of material exhibiting specific implementation-particular properties on the base substrate.

In many embodiments, more than one deposition apparatus are positioned at different angular positions on a planetary deposition apparatus as described herein. Different deposition apparatuses can be configured to dispose different materials onto the base substrate. As a result of this multi-deposition construction, an alternating layer structure can be formed; a first layer can be defined to a first thickness of a first material and a second layer can be defined to a second thickness of a second material, and so on.

In some embodiments, alternating layers have the same relative thickness. A first layer of a first material has a thickness equivalent to a second layer of a second material disposed onto the first layer. In other cases, different layers can have different thicknesses or other properties. For example, although rotation rate of the planetary deposition apparatus may be consistent when passing under multiple discrete deposition apparatuses, deposition rates and/or other deposition properties of different deposition apparatuses may be different, resulting in different layer thicknesses for different materials.

For embodiments described herein, a multilayer stack of materials can be formed prior to an annealing process configured to cause crystallites to form, as described above. In this manner, a layer of alternating materials disposed as described herein can be referred to as an "anneal precursor," as such a construction precedes annealing operations.

In other cases, substrate temperature can be increased (e.g., to 350° C.-450° C. as one example) during deposition such that crystallites form during or after deposition, without requiring subsequent annealing operations.

In other embodiments, annealing may not be required. For example, deposition of material can be performed with a high-temperature deposition process, at in some examples or near an anneal temperature of a deposited material. In these examples, crystallites can agglomerate during and/or after deposition, thereby reducing or eliminating any need for further annealing steps or operations.

In many embodiments, only two alternating materials can form a multilayer anneal precursor, as described herein (e.g., a stack is formed by alternating between two different materials, alloys, and so on). In other cases, any suitable number of different layers and materials alternating in any suitable manner may be defined. A person of skill in the art may readily appreciate that layer and material properties, both independent and relative to one another, can be defined by tuning, in an implementation-specific manner, one or more properties or operational settings of one or more of the deposition apparatuses.

For simplicity of description and illustration, many embodiments described herein reference an anneal precursor that is formed by alternatingly layering two different materials over one another. A first material may be a transition metal oxide, such as nickel oxide. The second material may be another, different, transition metal oxide such as tantalum oxide or tungsten oxide. In this example, a plurality of layers of nickel oxide are interlayered with a plurality of layers of tantalum or tungsten oxide. Either or both of the different layer types can be also subjected to lithium ion deposition such that lithium metal is implanted in either or both layers during the deposition process(es) thereof. In many embodiments and/or some regions of a substrate/stack, lithium may not be required; lithium concentration may be zero.

In one particular embodiment, a planetary deposition apparatus may be used to alternatingly dispose/define the layers of a multilayer anneal precursor as described herein. For example, a glass substrate with a metal oxide layer (e.g., indium-tin oxide) can be secured eccentrically to a rotating platform of the planetary deposition apparatus. As the glass substrate is rotated around the central axis of the deposition apparatus, the substrate may pass below a first deposition apparatus configured to dispose tantalum oxide and a second deposition apparatus configured to implant lithium ions and a third deposition apparatus configured to dispose nickel oxide. By varying the deposition rates of the first, second, and third deposition apparatuses, other operational parameters thereof (e.g., voltage, temperature, material concentrations, densities, and so on), and by varying the rotation rate of the rotating platform, nanoscopic layers of each of a nickel oxide and lithiated tantalum oxide can be formed. Each rotation of the rotating platform disposes a new set of nanoscopic layers above an upper surface of the previously disposed nanoscopic layer. As understood by a person of skill in the art, a total time in which the glass substrate is rotated informs a total thickness of the anneal precursor stack.

In one embodiment, the nanoscopic layers of nickel oxide and lithiated tantalum oxide are disposed to 0.1 nm to 1.5 nm in thickness, with the anneal precursor stack formed to a total thickness of 100-150 nm. In other cases, other total thicknesses can be achieved (e.g., at scales of ~10 nm, ~100 nm, ~1000 nm, and so on). In other cases, other individual layer thicknesses can be achieved (e.g., at scales of ~0.1 nm, ~1.0 nm, ~10 nm, 100 nm, and so on). Parameters for a particular embodiment vary by implementation.

Once a multi-layer structure is formed, such as described above, the multilayer structure can be annealed, in some embodiments. As noted above, annealing may not be required of all implementations, especially for high temperature deposition embodiments. During an annealing process (which can take place at a suitable temperature, for a suitable period of time), individual crystallites may form by conglomeration of material of one or more of the layers during annealing. It may be appreciated that different annealing temperatures and conditions, paired with different layer thicknesses and/or layer variations, can result in different crystallite formation characteristics.

For example, portions of a layer of nickel oxide may conglomerate to form nickel oxide crystals. In addition, some nickel/nickel oxide may bond with tantalum oxide and lithium to form a field of lithiated tantalum-nickel oxide. As one specific example, $NiO_x$ may be disposed along with lithium ion implanted $WO_x$ or $TaO_x$.

After annealing, crystallites of $NiO_x$ may be disposed to a particular density within a field of $Li_zW_xNi_{(1-x)}O_y$, or $Li_zTa_xNi_{(1-x)}O_y$ for tungsten oxide or tantalum oxide respectively. Dimensions of the $NiO_x$ crystallites may vary from embodiment to embodiment, but in many cases, with nanoscopic layer deposition, the $NiO_x$ crystallites have a diameter (or primary/largest dimension) of 5 nm.

These foregoing manufacturing techniques can be leveraged to form a counter electrode of an electrochromic stack, such as described herein. For example, as noted above, a first deposition apparatus (e.g., leveraging chemical vapor deposition, sputtering, evaporation, or another suitable deposition method) can be configured to dispose a layer of an electrochromic material such as nickel oxide and a second deposition apparatus leveraging the same or a different deposition technique can be configured to dispose a second layer, different from the first layer, of electrochromic material, such as a tungsten oxide or a tantalum oxide. A third deposition apparatus may be configured to dispose (e.g., via RF deposition, intercalation techniques and so on) one or more lithium layers, optionally, either as implanted lithium ions or as lithium metal. This deposition pattern can be repeated for each rotation of the planetary deposition apparatus. In this example, when the layered stack is annealed, nickel-oxide crystallites may form, suspended within a lithiated tungsten-oxide or lithiated tantalum-oxide bulk.

As noted above, by varying deposition and annealing properties, different crystallite geometries, dimensions, and dispersion densities can be formed. For example, thinner nickel oxide layers may be associated with smaller overall crystallites although the dispersion of those crystallites may be less consistent than with thicker layers of nickel oxide. Similarly, by controlling layer thickness/thickness of tungsten oxide or a tantalum oxide (or other suitable transition metal oxides), different dispersion properties of the nickel oxide crystallites can be achieved.

In particular, for embodiments described herein, example variables that can affect crystallite formation include but are not limited to: deposition temperature; planetary deposition apparatus rotation rate; deposition speed; deposition apparatus power; layer thickness/thickness; deposition technique; annealing temperature; annealing time; lithium deposition quantity (also referred to as saturation); lithium deposition technique; and so on.

In some embodiments, a deposition temperature may be in the range of 350° C.-450° C., relative power of deposition between two different disposed materials (e.g., nickel oxide and tungsten/tantalum oxide) can be varied between 50/50 and 95/5 or greater or lower relative powers, layer thicknesses may be disposed between 0.1 to 1.5 nm, lithium deposition may vary from 0% saturation to 100% saturation (in some cases, a gradient of lithium deposition may be used; different saturations may be selected for different layers), and annealing temperature or substrate temperature may be in the range of 450° C. or higher.

Such a configuration may result in nickel-oxide crystallite formation of approximately 5 nm in diameter, suspended in a field of lithiated metal oxide, such as lithiated tantalum-oxide or lithiated tungsten oxide. This configuration may be particularly useful for fast-switching, high transparency/transmittance, and high contrast (e.g., between bleach states and colored states or transparent states and opaque states) implementations of an electrochromic aperture as described herein for use with an imaging system of an electronic device.

It may be appreciated that the foregoing example embodiments are not exhaustive of the various configurations that may be used in different implementations; different methods may be suitable to for an electrochromic material/counter electrode of an electrochromic stack, as described herein.

Independent of manufacturing technique, an electrochromic material of an electrochromic stack of an imaging system component as described herein can be formed as, with, onto, positioned on, and/or disposed on, an ion conductor layer that facilitates transfer of ions (e.g., lithium ions) to, or from, the electrochromic material, thereby electrochemically inducing an oxidation-reduction in the electrochromic material that in turn changes one or more optical properties of that material, such as transmittance (in a particular band or set of bands of visible or nonvisible light) and/or reflectance (in a particular band or set of bands of visible or nonvisible light). For preceding examples, the field of $Li_zW_xNi_{(1-x)}O_y$ or $Li_zTa_xNi_{(1-x)}O_y$ may serve as an ion conductor to, or from, $NiO_x$ crystallites. In these constructions, as distinct from conventional electrochromic stacks, the electrochromic material ($NiO_x$ crystallites) is disposed within, and dispersed to a particular density within, the ion conductor material ($Li_zW_xNi_{(1-x)}O_y$ or $Li_zTa_xNi_{(1-x)}O_y$); conventional implementations, by contrast, stack multiple layers of material over one another in manner that can impart substantial and meaningful phase distortion, clouding, surface roughness (scattering) and other undesirable imaging aberrations. By dispersing an electrochromic material within an ion conductor layer, a thinner overall profile can be achieved and transparency over conventional systems is greatly improved.

For simplicity of description, once an anneal precursor (formed from multiple layers of alternating transition metal oxides, implanted with lithium ions) is annealed to form a dispersion of crystallites in an ion conductor layer, it may be referred to herein as an "electrochromic layer."

An electrochromic layer can be disposed between and/or formed between two electrically conductive and optically transparent layers that are conductively decoupled from one another, as noted above. The optically transparent conductive layers may be formed from a transparent electrically conductive material such as a metal oxide (e.g., indium tin oxide, as one example). In other cases, the optically transparent conductive layers may be formed from a metal nanowire dispersion. Each of the conductive layers can, in turn, be conductively coupled to at least a respective one electrode, which may be formed from metal. In some cases, an electrode can be at least partially defined as a via through the optically transparent substrate.

As a result of this construction, applying a voltage across the two electrodes generates an electric field between the two optically transparent conductive layers which, in turn, motivates ion transfer to, or from, the crystallites in the electrochromic layer. This change in ion concentration (e.g., charge concentration), as noted above, can result in an oxidation-reduction reaction that affects transmittance (e.g., opacity) and/or reflectance (e.g., color) of the electrochromic layer.

For simplicity of description, the embodiments that follow reference an electrochromic stack/layer configured to change transmittance in the visible spectrum, although it is appreciated that this is merely one example and other electrochromic stacks and other imaging system components can be configured in other ways.

An electrochromic stack, as described herein, can be leveraged in one example as a variable aperture for an imaging system, such as a camera system of a portable electronic device. More particularly, an electrochromic stack having a ring-shaped electrochromic material, with a transparent (e.g., not actively switched) central region, can be positioned between a lens and an image sensor of an imaging system to control an amount of light focused by the lens that reaches the image sensor.

More specifically, the electrochromic stack in such configurations can define a switched area and a non-switched area. The switched area can change from transparent to opaque and opaque to transparent by selective application of voltage, such as described herein. The non-switched area, positioned within a geometric center of the electrochromic stack, retains transparency so light can always pass therethrough.

For simplicity of description, many embodiments that follow reference a electrochromic stack/switchable aperture having only one switched region, but it may be appreciated that this is merely one simple example and that, in other examples, multiple switched regions can be included.

In typical embodiments, a non-switched area or region takes a circular shape, and the switched area circumscribes the circular, non-switched area. In this configuration, applying at least a threshold voltage (which may be implementation specific) to the electrodes of the electrochromic stack causes the switched region to transition from transparent to opaque or opaque to transparent, selectively.

As may be appreciated, when the switched region is transparent, the electrochromic stack may transmit light through both the switched region and the non-switched region. Conversely, when the switched region is opaque, the electrochromic stack may transmit light only through the non-switched region.

In this manner, voltage applied to the electrochromic stack controls a size of a light-transmissible area of the electrochromic stack. More broadly, the electrochromic stack defines a multi-stop aperture that can be used with an imaging system; voltage controls an effective radius (or stop) of a transparent portion of the electrochromic stack.

In certain configurations, multiple discrete switching regions can be concentrically defined around the non-switched region. In this manner, sequentially applying voltage to additional switching regions can change the effective radius of the transparent portion of the electrochromic stack through multiple discrete stops. For imaging system implementations, these described constructions offer selectable, analog-domain, control of either or both image brightness and/or depth of field that would otherwise be difficult and/or impossible to reproduce digitally.

An electrochromic stack implemented as a variable aperture for an imaging system can be manufactured in a number of suitable ways. In a first example, the electrochromic stack is disposed layer-by-layer on a base substrate, such as the optically transparent substrate (e.g., silica) referenced above. In particular, a first conductive layer can be disposed and/or formed into the base substrate, for example by physical vapor deposition or tape casting. Thereafter, one or more electrochromic layers can be formed by alternatingly disposing transition metal oxides, and annealing the stack to define a dispersion of crystallites within a field of ion conductor material. A second conductive layer can thereafter be disposed and/or formed onto the electrochromic layer stack.

Once an electrochromic stack is formed, such as described above or by another similar method, a switching region and a non-switching region may be defined using one or more suitable techniques, for example by leveraging laser etching to conductively decouple one portion of one electrode of the electrochromic stack from other portions of the electrochromic stack such that the decoupled region no longer switches when a voltage is applied to the stack. In other cases, a non-switching portion can be etched away (e.g., via chemical etching or another suitable technique), and backfilled with an index-matched material.

These foregoing and other embodiments are discussed below with reference to FIGS. 1A-6. However, those skilled in the art will readily appreciate that the detailed description given herein with respect to these figures is for explanation only and should not be construed as limiting.

FIG. 1A depicts an example electronic device that can include an imaging system and/or imaging system component, such as described herein. The electronic device 100 may be a portable electronic device, such as a cellular phone, wearable device, or tablet computing device. It may be appreciated, however, that a portable electronic device is merely one example device that can include an imaging system and/or imaging system component as described herein.

The electronic device 100 as depicted in FIG. 1A is defined at least in part by a low-profile housing, identified in the figure as the housing 102. The housing 102 can enclose and support one or more components of the electronic device 100, such as a processor, one or more memory components or circuits, a battery, and a display 104. For simplicity of description and illustration, FIG. 1A is depicted without many of these components; a person of skill in the art may readily appreciate that a number of components, circuits, structures, and systems can be included in the housing 102 of the electronic device 100. For example, the electronic device 100 can include a processor configured to access a memory to instantiate a software application configured to render a graphical user interface via the display 104.

Figure 1B:
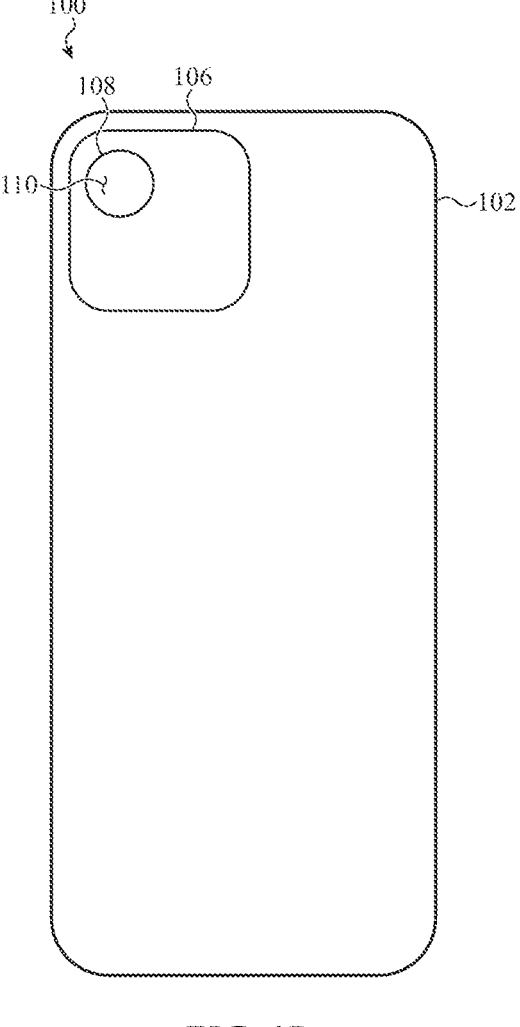
FIG. 1B depicts the example electronic device of FIG. 1A, showing an imaging system, such as described herein.

The software application can, in some examples, be configured to integrate with one or more hardware sensors or sensing systems of the electronic device 100, such as an imaging system. FIG. 1B depicts the example electronic device of FIG. 1A, showing an imaging system 106. The imaging system 106 can include a camera module 108 that includes a set of imaging system components 110.

In particular, the imaging system 106 can include an image sensor disposed at an image plane defined by a lens group of the set of imaging system components 110. The lens group may define a fixed or variable focal length. The set of imaging system components 110 can also include a variable or multi-stop aperture as described herein. The multi-stop aperture can be positioned between the lens group and the image sensor so as to control a quantity of light received by the image sensor. As known to a person of skill in the art, the multi-stop aperture can offer control over image brightness and depth of field.

In many examples, the multi-stop aperture can include an electrochromic stack, as described herein. In particular, the multi-stop aperture may be defined, at least in part, by an electrochromic stack that defines at least one switchable region and, in many examples, a non-switching region. In some cases, a non-switching region may not be required; in such examples, the multi-stop aperture may also function as a shutter, transitioning from fully opaque (or substantially opaque) to at least partially transparent. As one example, a switching region can transition from 5% transmissivity (colored state) to 90% transmissivity (bleached state), 3% transmissivity (colored state) to 95% transmissivity (bleached state), 2% transmissivity (colored state) to 99% transmissivity (bleached state), or any other suitable state. These are merely examples, other embodiments can include other transmissivities defining bleached states, colored states, or transition states between fully-bleached and fully-colored states.

The non-switching region of the electrochromic stack of the multi-stop aperture can be positioned generally in a geometric center of the multi-stop aperture. In many examples, the non-switching region takes a circular shape, although this is not required of all embodiments and other shapes may be possible or preferred. In typical examples, the non-switching region is aligned with an imaging axis of the lens group and the image sensor.

The non-switching region of the electrochromic stack of the multi-stop aperture is circumscribed by a switching region. As noted with respect to other embodiments described herein, the switching region can toggle between transparent and opaque in response to an application of appropriate, implementation-specific, voltage (e.g., at least a threshold voltage of a particular polarity). In some cases, application of voltage induces a transition from transparent to opaque. In other cases, application voltage induces a transition from opaque to transparent.

In this manner, when the switching region circumscribing the non-switching region is opaque, the effective diameter of the multi-stop aperture is defined by a diameter of the non-switching region. Alternatively, when the switching region is transparent, the effective diameter is larger and is defined by the a diameter or area of the switching region.

In some embodiments, as noted above, the switching region can be segmented into concentrically-aligned switchable regions so that multiple discrete aperture diameters can be selectively activated. For simplicity of description, the embodiments described herein focus to implementations with a single switching region; it is appreciated that this is merely one example and other embodiments may be implemented differently.

The switching region of the electrochromic stack of the multi-stop aperture is conductively coupled to a controller, which may be referred to as an aperture controller. The aperture controller can include a switchable voltage source that can be selectively applied to the switching region to change the transmissivity thereof.

In many cases, the aperture controller is communicably coupled to one or more instances of software executing over a processor disposed within the housing 102 of the electronic device 100. For example, in some embodiments, a software application instance instantiated over a processor and/or memory of the electronic device 100 can leverage the display 104 to generate a user interface with which a user of the electronic device 100 can interact. In some examples, the software application may be an imaging application, such as a camera control application.

The camera control application can present one or more user interface elements via the display 104 which may be selected by a user. In some cases, one of the user interface elements can be used by a user of the electronic device 100 to control a size of the aperture. In other words, in some cases, the user interface may receive a signal or other input from a user comprising an instruction to change a size of the aperture of the camera module 108. In response to the signal received via the user interface, the aperture controller can apply a voltage to at least one switching region of the electrochromic stack to change a transmissivity of that region, thereby changing an effective diameter of the multi-stop aperture of the imaging system 106.

These foregoing embodiments depicted in FIGS. 1A-1B and the various alternatives thereof and variations thereto are presented, generally, for purposes of explanation, and to facilitate an understanding of various configurations and constructions of a portable electronic device that can incorporate an imaging system that includes a variable aperture, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2:
FIG. 2 is a simplified system diagram of an electronic device as described herein.
Figure 2:
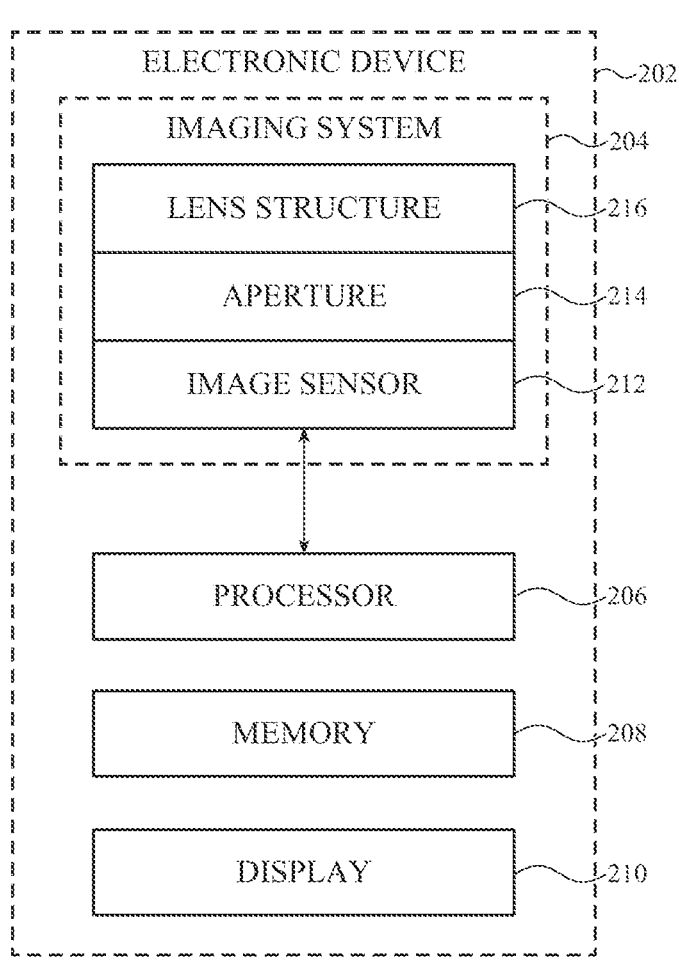

For example, more generally and broadly, it may be appreciated that any suitable electronic device can include an imaging system as described herein. FIG. 2 is a simplified system diagram of such an example electronic device that can include an imaging system, as described herein.

For example, an electronic device that can include an imaging system and/or imaging system component as described herein can be implemented as an example electronic device, identified in FIG. 2 as the electronic device 200.

The electronic device 200 can include a processor 202, a memory 204, and (optionally) a display 206. As noted with respect to other embodiments described herein, the processor 202 can be configured to access the memory 204 to retrieve one or more computer-executable instructions and/or other executable assets in order to instantiate one or more instances of software that, in turn, may perform or coordinate one or more operations performed by the processor 202.

For example, in some embodiments, the electronic device 200 can leverage the processor 202 and the memory 204 to instantiate an instance of a photography software application. The photography software application instance can be configured to access and/or communicably couple to an imaging system 208 of the electronic device 200.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

Similarly, the term "memory" refers to any software and/or hardware-implemented data processing device or circuit physically and/or structurally configured to define a temporary or durable (e.g., volatile or nonvolatile) storage media configured to store one or more data structures or files and so on, regardless of media type (e.g., optical, magnetic, electric, photonic, and so on).

The imaging system 208 can include a lens structure 210, a multi-stop aperture 212, and an image sensor 214. The lens structure 210 can be configured to receive and focus light from a scene external to the electronic device 200 that may be imaged by the image sensor 214. The lens structure 210 can include any suitable number of optical elements configured to modify a phase or direction of light passing through. The lens structure 210 can include one or more movable or fixed concave or convex lenses; the configuration and/or position of the lenses of the lens structure 210 can vary from embodiment to embodiment.

In some cases, the lens structure 210 can also include one or more filters configured to exhibit selected reflectance and/or transmittance for particular bands of light. For example, the lens structure 210 can include an infrared cut filter configured to reflect infrared light away from the image sensor 214. In other cases, an infrared cut filter may be configured to absorb infrared light. In yet other cases, the lens structure 210 can include one or more color filters configured to reflect particular colors of light. In yet other cases, the lens structure 210 can include one or more reflective surfaces, such as mirrors or beam splitters configured to redirect a path of light as it passes through the lens structure 210. For example, in some constructions the imaging system 208 can be implemented with a periscopic lens structure.

These forgoing examples are not exhaustive of the types or arrangements of optical elements that can be leveraged by an imaging system, such as described herein. In particular, it may be appreciated by a person of skill in the art that the lens structure 210 can include any number of suitable optical elements, arranged in any suitable order, for any particular embodiment.

The imaging system 208 also includes a multi-stop aperture 212 positioned between the lens structure 210 and the image sensor 214. The multi-stop aperture 212 is configured to selectably control a quantity of light exposed to the image sensor 214. More specifically, the multi-stop aperture 212 defines a switchable opaque area circumscribing a non-switchable transparent area. The transparent area is defined in a center of the multi-stop aperture 212 and exhibits substantially the same index of refraction as the switchable opaque area that circumscribes the transparent area.

For example, in some constructions the transparent area of the multi-stop aperture 212 is formed from a non-active/deactivated portion of an electrochromic stack. An active portion of the same electrochromic stack can circumscribe the non-active portion. In this construction the entire multi-stop aperture is formed from the same layers of material, and thus exhibits substantially the same index of refraction across its area, regardless whether light passes through the non-active portion of the electrochromic stack (e.g., a non-switched, transparent, central region) or whether light passes through the active portion of the electrochromic stack.

An electrochromic stack including an active portion (switching portion) circumscribing a non-active portion (non-switching portion) and can be manufactured in a number of suitable ways. In some embodiments, a sheet of annealed electrochromic material (e.g., a sheet defining a single, active area) includes two transparent conductive sheets disposed on opposite surfaces of an ion conductor layer and an electrochromic material. In these examples, one or both of the conductive sheets can be etched via laser or chemical processes to conductively decouple one portion of the sheet from another. For example, a laser may be used to define a non-switching region from a switching region by tracing out a circular pattern following a perimeter of a desired shape of the non-switching region. In another example, an etch process may be used to conductively decouple the switching region from the non-switching region.

In these examples, a channel that separates the switching region from the non-switching region can introduce phase distortion or other undesirable effects. More specifically, light that passes through the channel encounters a different index of refraction than light that passes through the switching region or the non-switching region. More specifically, light that passes through either the switching region or the non-switching region first encounters a transparent conductive sheet whereas light that passes through the channel first encounters either an electrochromic material or an ion conductor layer. As a result of this difference, phase of light that reaches the image sensor 214 may be different depending on whether that light passed through the channel of the multi-stop aperture 212 or a switching or non-switching region of the multi-stop aperture 212.

To account for, and mitigate, phase distortion and other undesirable optical effects, the channel can be backfilled as described above with a dielectric material that approximates, and/or is equal to, an index of refraction of the transparent conductive layer through which the channel is defined. For example, in some embodiments, the transparent conductive layer may be formed from indium-tin oxide, which may have an index of refraction of 1.9-2.0. In this example, the channel may be backfilled with niobium oxide, zirconium oxide, silicon nitride, or mixtures thereof to define a dielectric backfill material having an index of refraction approximately equivalent to 1.9-2.0. In other examples, a material having an index of refraction as close to 1.9-2.0 as possible may be selected; custom dielectric materials may be suitably designed and used to approximate an index of refraction of the conductive layer. In some cases, the dielectric may be a solid material, such as a cured adhesive or polymer material. In other cases, a liquid dielectric may be used. In still other cases, the channel may be backfilled with a gas having an index of refraction equal to and/or approximating an index of refraction of the conductive layer. In these examples, the multi-stop aperture 212 may be hermetically sealed to prevent gaseous or liquid backfill materials from escaping.

As a result of the foregoing described implementation, light that passes through the multi-stop aperture 212 may encounter substantially the same index of refraction and path length, regardless of whether that light passes through the non-switching region, the switching region, or the channel region separating the switching region from the non-switching region.

In other configurations, a non-switching region of the multi-stop aperture 212 can be formed by etching through an entire electrochromic stack (e.g., not just the outermost transparent conductive layers). In these examples, a cavity taking the shape of a non-switching layer can be defined by etching through the entire stack. As with other embodiments described herein, the cavity can be filled with a material that approximates the index(es) of refraction of light passing through other portions of the multi-stop aperture 212.

In some cases, more than one backfill material may be used. In such examples, a multilayer backfill material can be architected such that each successive layer is disposed to a thickness and exhibits an index of refraction approximating another layer within the same plane. For example, a first layer of backfill may be disposed to the thickness of a first transparent conductive layer and may have an index of refraction approximating the index of refraction of the first transparent conductive layer. A second layer of backfill material may be disposed over the first backfill layer and may be disposed to a thickness of an electrochromic layer disposed over the first transparent conductive layer. The second backfill layer may have an index of refraction substantially approximating an index of refraction of the electrochromic layer.

These foregoing examples are not exhaustive; it may be appreciated that any number of suitable optically transparent materials and/or backfill layers may be used in other embodiments.

These foregoing embodiments depicted in FIGS. 1A-2 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

FIG. 3A depicts an imaging system component 300 in cross-section that may be used with an imaging system incorporated into an electronic device, such as described herein.

The imaging system component 300 can be incorporated into any suitable imaging system for use with any suitable electronic device as described herein (e.g., see FIGS. 1A-2). In many embodiments, the imaging system component 300 is incorporated into a low-profile camera module of a portable electronic device, such as a cellular phone although it may be appreciated that this is merely one example.

The imaging system component 300, as with other embodiments described herein, can be configured to operate as a variable stop aperture.

In this example embodiment, the imaging system component 300 is configured to be positioned relative to an image sensor 302 so that the imaging system component 300 can effectively control a quantity of light exposed to the image sensor 302. More specifically, an electrochromic layer 304 can be aligned parallel to an imaging surface of the image sensor 302. A geometric center of the electrochromic layer 304 may be aligned with a geometric center of the imaging surface of the image sensor 302. Relative positioning between the electrochromic layer 304 and the image sensor 302 may vary from embodiment to embodiment.

The electrochromic layer 304 can be electrically and conductively coupled to an aperture controller 306 configured to apply at least a threshold voltage to the electrochromic layer 304 to change opacity (transmittance) of a switching region 308 of the electrochromic layer 304 to change an effective transparent radius of the electrochromic layer 304, thereby changing a quantity of light exposed to the image sensor 302.

The electrochromic layer 304 includes a substrate 310 that may be formed from glass. In some cases, the substrate 310 defines a volume in which other functional and structural layers of the electrochromic layer 304 can be disposed. In some cases, the substrate 310 is formed from silica, although this is merely one example. In the illustrated example embodiment, the substrate is defined by an upper sheet and a lower sheet coupled by sidewalls to define an interior volume. It may be appreciated that this is merely one example construction and that other embodiments may be implemented in different ways.

The substrate 310 of the electrochromic layer 304 can have disposed on one or more external surfaces thereof an antireflective coating, such as an antireflective coating 312. In some cases, the antireflective coating 312 may be disposed onto a surface of the substrate 310 by sputtering or another physical vapor deposition process. In other cases, the antireflective coating 312 may be adhered to the substrate 310 with an adhesive. In yet other examples, the antireflective coating 312 may be disposed into the substrate 310 as a liquid which is thereafter cured. It may be appreciated that these examples are not exhaustive; a person of skill in the art may readily appreciated that many suitable methods of disposing an antireflective coating may be used.

A first transparent conductor 314 may be disposed on a surface of the substrate opposite the antireflective coating 312. The first transparent conductor 314 can be formed from any number of suitable conductive transparent materials such as and including indium-tin oxide or other conductive metal oxides. The first transparent conductor 314 can be disposed onto a surface of the substrate 310 via any suitable method including physical vapor deposition.

The electrochromic layer 304 can be disposed over the first transparent conductor 314. The electrochromic layer 304 can be implemented in a number of ways. In some embodiments, the electrochromic layer 304 is formed from a lithiated oxide such as a lithiated tungsten oxide or a lithiated niobium oxide. In other cases, the electrochromic layer 304 includes an electrolyte conductive layer and an inorganic or organic electrochromic layer disposed over the electrolyte layer. These examples are not exhaustive; it may be appreciated by a person of skill in the art that a number of suitable materials and layer constructions of the electrochromic layer 304 can be used. In many cases, the electrochromic layer 304 is defined by a dispersion of transition metal oxide crystallites (e.g., 5 nm) suspending in a field of lithiated transition metal oxide, which includes a different transition metal oxide than the crystallites. In other cases, lithium implantation may not be required.

A second transparent conductor 316 may be formed over the electrochromic layer 304. The second transparent conductor 316 can be formed from the same material as the first transparent conductor 314, although this is not required of all embodiments.

The second transparent conductor 316 and the first transparent conductor 314 are disposed in a conductively decoupled manner such that when a voltage is applied across the conductors, a corresponding electric field can induce an electrochromic effect in the electrochromic layer 304. In particular, the first transparent conductor 314 can be conductively coupled to a first electrode 318 (which may be defined in part through the substrate 310) and the second transparent conductor 316 can be conductively coupled to a second electrode 320 (which, like the first electrode 318, may be defined in part through the substrate 310, e.g., as a through-glass via). As a result of this construction, the aperture controller 306 can be conductively coupled to the first and second electrodes in order to control electrochromic state(s) of the electrochromic layer 304.

In this example embodiment, the first transparent conductor 314 and/or the second transparent conductor 316 and/or the electrochromic layer 304 may be laser etched (or etched in another manner) to conductively decouple at least two portions thereof. In other cases, liftoff may be used to define two different, conductively decoupled portions. By decoupling these portions, as one example, the first transparent conductor 314 can define a first region and a second region or, more specifically, the switched region 308 and a non-switching region 322. As a result of this construction, an application of voltage by the aperture controller 306 to the first transparent conductor 314 via the first electrode 318 may only generate an electric field in the switched region, thereby only inducing an electrochromic effect in the switched region 308.

As a result of this construction, when the aperture controller 306 applies a voltage between the first electrode 318 and the second electrode 320, an electric field is generated only in the overlapping conductively-coupled areas between the first region of the first transparent conductor 314 and the second transparent conductor 316. In turn, because the electric field is generated only between the first region of the first transparent conductor 314 and the second transparent conductor 316, an electrochromic effect is only induced in the electrochromic layer 304 in that same area. In other words, when the aperture controller 306 applies a voltage to the first electrode 318 and the second electrode 320, only a portion of the electrochromic layer 304 changes from transparent to opaque, namely the switching region 308.

As a result of this architecture, the electrochromic layer 304 defines two separate and distinct regions—a non-switching region 322 having a shape defined by the channel 322 (e.g., in many cases, a circular shape) and a switching region 308. The switching region 308 circumscribes the non-switching region 322.

In this manner, if the aperture controller 306 applies a first voltage (e.g., which may be zero volts, positive voltage to a threshold, negative voltage to a threshold, and so on) to the electrochromic layer 304, the switching region 308 may be transparent, such as shown in FIG. 3B. Alternatively, if the aperture controller 306 applies a second voltage different from the first voltage to the electrochromic layer 304, the switching region 308 can transition to opaque, such as shown in FIG. 3C.

In some cases, a second substrate 324 can be adhered via an optically clear adhesive 326 to the second transparent conductor 316, thereby encapsulating and protecting the electrochromic layer 304 and the electrodes. The optically clear adhesive 326 may have an index of refraction selected to be substantially similar or identical to one or more antireflective coatings, such as the antireflective coating 312. In further examples, more antireflective coatings or layers can be added or positioned elsewhere in order to minimize reflections within the stack. It may be appreciated that these examples are not exhaustive; a person of skill in the art may readily appreciated that many suitable methods of disposing an antireflective coating may be used.

These foregoing embodiments depicted in FIGS. 3A-3C and the various alternatives thereof and variations thereto are presented, generally, for purposes of explanation, and to facilitate an understanding of various configurations and constructions of an imaging system component, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, as noted above, an electrochromic stack or layer, such as the electrochromic layer 304 can be manufactured in a number of ways using a number of suitable techniques.

In many embodiments as noted above, an anneal precursor stack may be formed and, thereafter annealed to define a dispersion of crystallites in an ion transfer medium. As noted with respect to many embodiments described herein, an anneal precursor can be formed by sequentially disposing two or more different materials over one another in a multilayered fashion. This stack of alternating (or otherwise patterned) layers can thereafter be annealed, during which crystallites may form.

Figure 4:
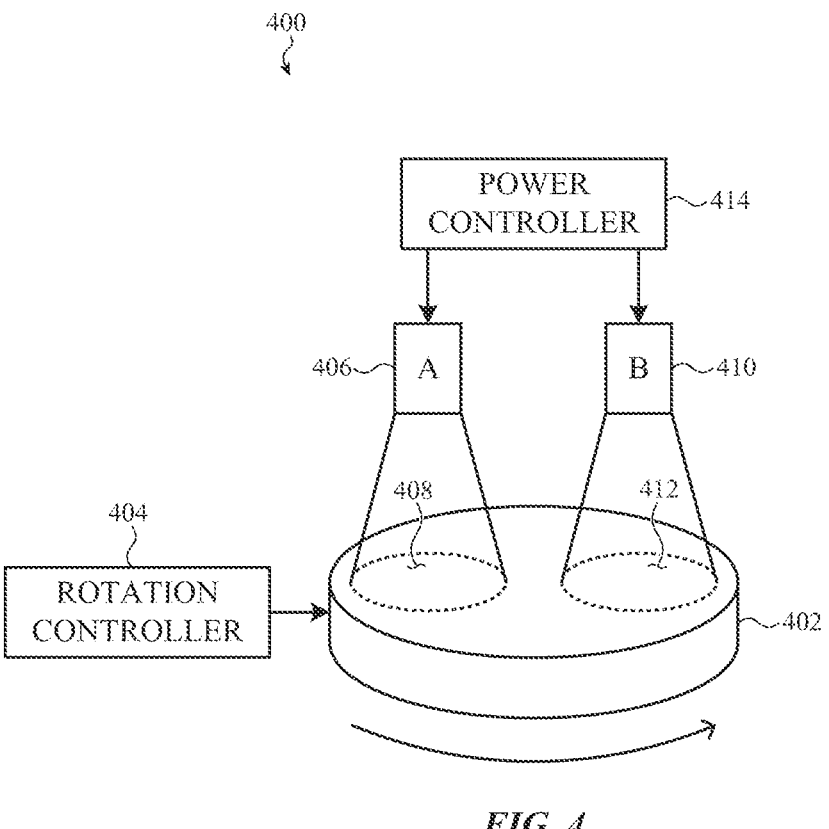
FIG. 4 depicts a simplified schematic view of a manufacturing step that may be leveraged to form an anneal precursor stack that, once annealed, defines a counter electrode of an imaging system component as described herein.

For example, a planetary deposition apparatus may be used, such as shown in FIG. 4. The illustrated embodiment depicts a deposition apparatus 400 that includes a rotating platform 402 onto which a substrate, such as glass may be coupled.

A rotation speed and/or positional angle of the rotating platform 402 may be controlled by a rotation controller 404. The rotation controller 404 may be configured to follow program instruction and/or may be configured to follow a rotation plan or deposition plan to selectively rotate the rotating platform 402 at a particular rate and/or according to a particular positional pattern or angular pattern.

The rotating platform 402 is positioned below or otherwise relative to two or more deposition apparatuses that each respectively are configured to dispose a particular material or combination of materials onto the substrate when the substrate is positioned within a particular angular range of the rotating platform 402. For example, a first deposition apparatus 406 may be configured to dispose material A onto the substrate when the substrate is within a region 408 of the rotating platform 402, whereas a second deposition apparatus 410 may be configured to dispose material B onto the substrate when the substrate is within a region 412 of the rotating platform 402. A power controller 414 may be communicably coupled or otherwise operationally coupled to each of the first deposition apparatus 406 and the second deposition apparatus 410 so as to control deposition parameters thereof. An example deposition parameter may be power, although it may be appreciated that this is merely one example.

As a result of this construction, as the rotation controller 404 causes the rotating platform 402 to rotate at a particular rate or according to a particular rotation/angular step pattern, a substrate affixed to the rotating platform 402 may develop and/or have disposed thereon alternating layers of material A and material B. A thickness of material A may be defined in part by the rotation rate of the rotating platform 402 as defined by the rotation controller 404, in part by the deposition rate of the first deposition apparatus 406, which may be informed by the power controller 414. Similarly, a thickness of material B may be defined in part by the rotation rate of the rotating platform 402 as defined by the rotation controller 404, in part by the deposition rate of the second deposition apparatus 410, which may be informed by the power controller 414.

In many embodiments, material A may be a first transition metal oxide, such as nickel oxide and material B may be a second transition metal oxide, such as tantalum oxide or tungsten oxide. Other materials are possible as well, as are other deposition apparatuses.

Furthermore, in some cases, one or more of the deposition apparatuses may be configured to dispose material in a particular pattern. For example, in some embodiments, a mask may be applied over the substrate in order to define a pattern with which a particular material is disposed. In other cases, etching steps or apparatuses may interpose the first and second deposition apparatuses so that one or more portions of the uppermost layers of the stack may be etched away prior to deposition of subsequent layers.

For example, the first deposition apparatus 406 may be configured to dispose nickel oxide at a rate of 1 nm thickness per second and the second deposition apparatus 410 may be configured to dispose tantalum oxide at a rate of 2 nm per second. The rotating platform 402 may have a radius of 1 m. Each of the region 408 and the region 412 may have a radius of 0.1 m (10 cm) and maybe be positioned at the edge of the rotating platform 402.

In this construction, each of the region 408 and the region 412, having a radius of 0.1 m and positioned centered at 0.9 m, (so as to intersect the perimeter of the edge of the rotating platform) from the center of the rotating platform 402 defines an angle of roughly 0.22 radians.

If the platform is rotated at a rate of 1 rpm (or 0.016666 rps) a person of skill in the art understands that the central portion of each of the region 408 and the region 412 eccentrically rotate through a distance of ~5.6 m every revolution of the rotating platform (r=0.9), a substrate rotating with the rotating platform will move at approximately 0.09 m/s or, framed in another way, 0.10 rad/s.

As a result of this construction, a substrate secured to the rotating platform 402, rotating at 1 rpm, will pass below each of the first deposition apparatus 406 and the second deposition apparatus 410 for slightly over a second. Given the deposition rates of each apparatus noted above, this architecture results in sequential layers of 1 nm nickel oxide and 2 nm of tantalum oxide.

To ensure uniform deposition, a deposition rate of each of the apparatuses may vary based on distance from the center of the rotating platform; the closer a region is to the center of the rotating platform, the lower the deposition rate may be. This may not be required of all embodiments.

In some cases, the rotating platform 402 may also pass a substrate affixed thereto below a lithium ion injection or deposition system. For example, in some embodiments, lithium ions may be injected into the layers of material B. In other cases, lithium injection/deposition may not be required at all. In further embodiments, a concentration of lithium may be vary across a region of the substrate such that different areas of the substrate and/or stack may have different lithium ion concentrations.

In some cases, one or more of the deposition apparatuses may be configured to dispose respective materials in a particular pattern. For example, nickel oxide may be sputtered in a manner that disposes a dotted pattern in lieu of a solid layer. A dotted pattern may improve crystallite formation in some embodiments. In other cases, other deposition processes or curing processes may be used, including pre-anneal/preparatory processes, baking processes, ion deposition processes, curing processes, masking processes, demasking processes, etching processes, polishing processes, surface preparation processes, and so on.

Once the deposition apparatus 400 is operated for a suitable and implementation-specific period of time, an anneal precursor may be the result, such as described above. In other cases, high temperature deposition may be used. In such examples, annealing may not be required and an anneal precursor, as described above, may be used as a counter electrode as described herein.

Figure 5A:
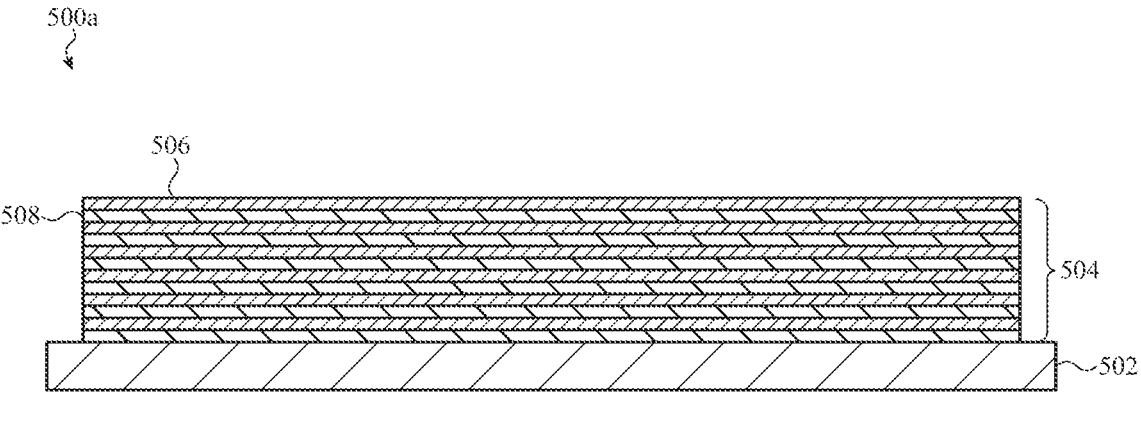
FIG. 5A depicts an anneal precursor multilayer structure in cross-section that can be annealed to define a dispersion of crystallites that can be used as a counter electrode of an imaging system component, such as described herein.

FIG. 5A depicts an example anneal precursor. The anneal precursor 500*a* includes a deposition surface defined by a substrate 502. The substrate 502 may be a monolithic substrate formed from silicon, silica, or other suitable material or combination of materials. In some embodiments, the anneal precursor 500*a* can be disposed over a metal oxide layer disposed onto the substrate 502, such as an indium-tin oxide layer.

The anneal precursor 500*a* is defined by an alternating stack of nanoscale materials 504. The alternating stack of nanoscale materials 504, as noted above, can include layers of a first transition metal oxide, such as layer 506, and layers of a second transition metal oxide, such as layer 508. Either or both the transition metal oxides can be lithiated to a particular concentration. In some cases, only certain layers may be lithiated. For example, among ten layer in the alternating stack of nanoscale materials 504, five layers may be a first transition metal oxide and five layers may be a second metal oxide. Five layers may be lithiated, or greater or fewer layers may be lithiated. Implementations may differ.

Figure 5B:
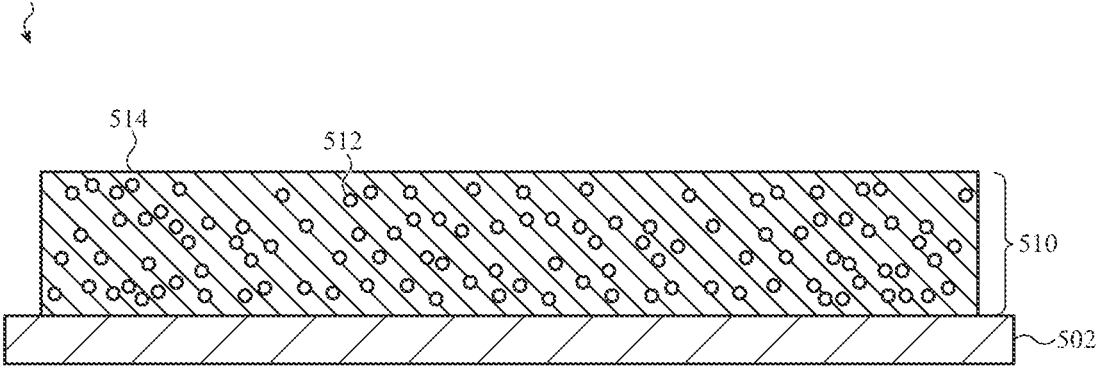
FIG. 5B depicts the anneal precursor of FIG. 5A after annealing.

Turning to FIG. 5B, once annealed, the anneal precursor 500*a* can be defined by a suspension 510 of crystallites 512 in a field 514. The crystallites 512 can each be an electrochromic transition metal oxide crystallite, such as a nickel oxide crystallite. The field 514 into which the crystallites 512 are dispersed can be an ion conductive material such as a lithiated transition metal oxide, such as lithiated tungsten nickel oxide. A person of skill in the art may appreciate that the concentration of the crystallites 512 and the relative spacing therebetween may vary from embodiment to embodiment. Similarly, the size of crystallites may vary based on operational parameters under which the anneal precursor (e.g., anneal precursor 500*a*) was formed including, but not limited to: deposition rate(s); lithium concentration; lithium injection rate; patterning; revolutions per minute; and so on.

Figure 5C:
FIG. 5C depicts another anneal precursor multilayer structure in cross-section that can be annealed to define a dispersion of crystallites that can be used as a counter electrode of an imaging system component, such as described herein.
Figure 5C:
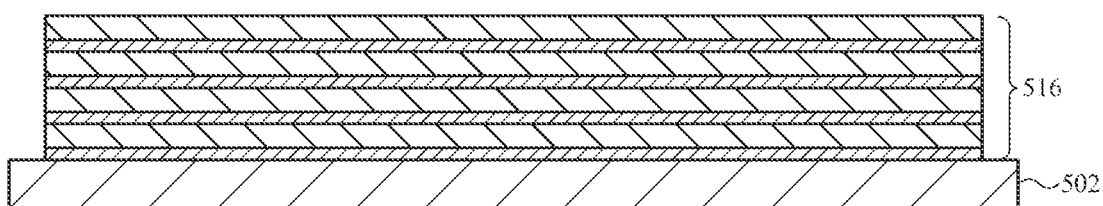

In some cases, as noted above, the alternating layers of an anneal precursor are not required to be the same thickness. For example, FIG. 5C depicts an anneal precursor 500*c* including an alternating stack of nanoscale materials 516 with different thickness.

In some cases, more than two materials (and/or more than two optionally lithiated materials) can be used. For example, FIG. 5C depicts an anneal precursor 500*d* including an alternating stack of nanoscale materials 518 depicting multiple materials, each of which may be disposed to a particular/selected nanoscale thickness.

Figure 5D:
FIG. 5D depicts another anneal precursor multilayer structure in cross-section that can be annealed to define a dispersion of crystallites that can be used as a counter electrode of an imaging system component, such as described herein.
Figure 5D:
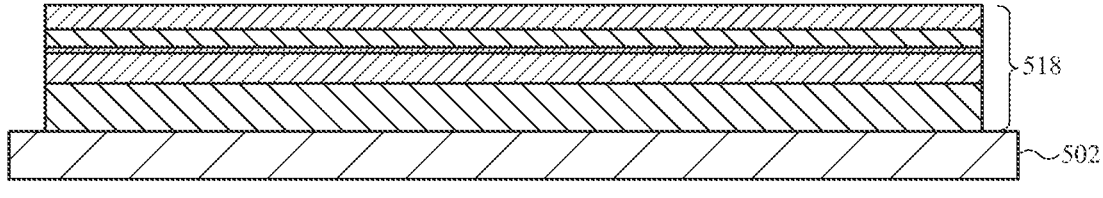

These foregoing embodiments depicted in FIGS. 4-5D and the various alternatives thereof and variations thereto are presented, generally, for purposes of explanation, and to facilitate an understanding of various configurations and constructions of an anneal precursor and methods of manufacturing the same, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, as noted above, some embodiments may not require annealing operations; high temperature deposition can be leveraged to form a dispersion of crystallites as described herein. Further, in some embodiments, lithium deposition may be optional.

Figure 6:
FIG. 6 is a flowchart depicting example operations of a method of manufacturing an imaging system component, such as described herein.
Figure 6:
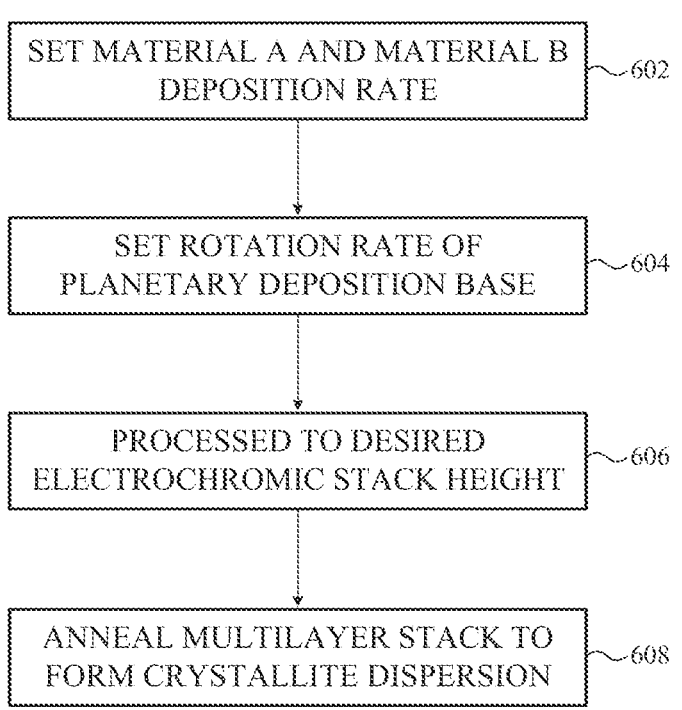

FIG. 6 depicts a flow chart corresponding to example operations of a method of manufacturing an anneal precursor and electrochromic aperture as described herein. The method 600 incudes operation 602 at which a first and second material deposition rates of a planetary deposition system are selected and set. At operation 604, rotation rate of the planetary deposition system is set. At operation 606, the planetary deposition system is operated until a desired total stack height/thickness is achieved. Finally, at operation 608, the anneal precursor resulting from operation 606 may be annealed to form a crystallite dispersion suitable for operation as a counter electrode of an electrochromic aperture, as described herein.

In some embodiments, as noted above, the multilayer structure that may be constructed by leveraging a method such as that shown and described with reference to FIG. 6 may not require annealing at all. For example, in some embodiments, the method 600 can operate by selecting, at operation 602, not only a deposition rate for each of two or more deposition apparatuses, but also a deposition temperature. In other words, operation 602 can define a target substrate temperature and/or a target substrate temperature range for the substrate. The substrate temperature may be consistent as the planetary deposition apparatus rotates, or in some cases, the substrate temperature may be varied. For example, the planetary deposition apparatus may include stages between deposition regions in which the substrate temperature is increased, decreased, or otherwise changed according to a deposition plan or a temperature plan.

For example, in some cases, substrate temperature may be increased to, or just below, an annealing temperature of one or more of the deposited materials between individual layers. As a result, each individual nanoscale layer may be annealed prior to deposition of a subsequent layer. In some cases, substrate temperature may be increased after a particular deposition of a particular material to an agglomeration temperature, a temperature at which agglomeration of material of the deposited layer is likely to occur. The agglomeration temperature may be above or below an annealing temperature and, as known to a person of skill in the art, will vary by material and desired crystallite size.

Figure 7:
FIG. 7 is a flowchart depicting example operations of another method of manufacturing an imaging system component, such as described herein.
Figure 7:
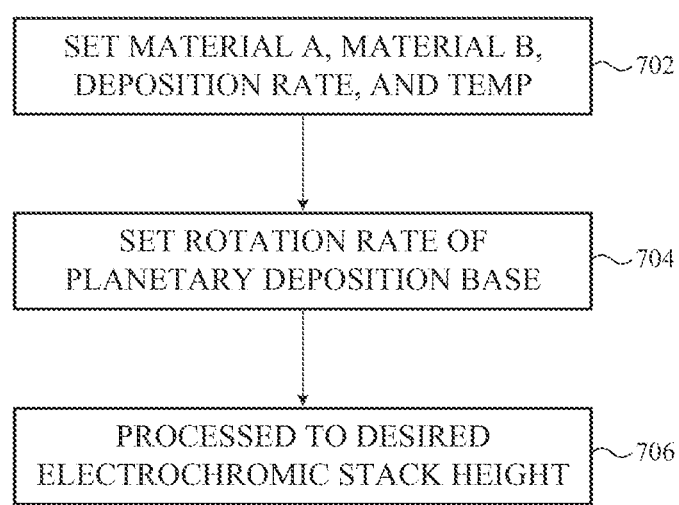

For example, FIG. 7 depicts a flow chart corresponding to example operations of a method of manufacturing an anneal precursor and electrochromic aperture as described herein. The method 700 incudes operation 702 at which a first and second material deposition rates of a planetary deposition system are selected and set, in addition to substrate and/or deposition temperatures associated therewith. At operation 704, similar to the method of FIG. 6, rotation rate of the planetary deposition system is set. At operation 706, the planetary deposition system is operated until a desired total stack height/thickness is achieved. Thereafter, the stack may be optionally annealed, or in some cases, may be singulated, encapsulated, cleaned, polished, or otherwise prepared for further processing.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A stack capable of defining at least a portion of an electrochromic layer of an imaging system in a portable electronic device, the stack comprising:
  an optically transparent substrate;
  a metal oxide layer disposed onto the optically transparent substrate; and
  a precursor layer disposed onto the metal oxide layer to a first thickness, the precursor layer capable of defining an electrochromic counter electrode of the electrochromic layer of the imaging system when annealed, the precursor layer comprising a lithiated transition metal oxide stack defined by alternating layers of a first transition metal oxide and a second transition metal oxide; wherein:
    the first transition metal oxide is nickel oxide;
    the second transition metal oxide is tungsten oxide or tantalum oxide;
    each layer of first transition metal oxide is disposed to a second thickness; and
    each layer of second transition metal oxide is disposed to a third thickness.

2. The stack of claim 1, wherein the second thickness is greater than the third thickness.

3. The stack of claim 1, wherein the second thickness is approximately equal to the third thickness.

4. The stack of claim 1, wherein the first thickness is selected at least in part to optimize for optical transparency.

5. The stack of claim 1, wherein the optically transparent substrate is formed from silica glass and the metal oxide layer comprises indium tin oxide.

6. A method of forming an anneal precursor stack and a counter electrode of an electrochromic layer of an imaging system in a portable electronic device, the method comprising:
  forming the anneal precursor stack by:
    selecting an optically transparent substrate;
    disposing a first metal oxide layer onto a surface of the optically transparent substrate;
    forming a precursor layer, to a first thickness, over the metal oxide layer by alternatingly disposing:
      a second thickness of a first transition metal oxide over an uppermost layer of the precursor layer; and
      a third thickness of a second transition metal oxide over the uppermost layer of the precursor layer; wherein lithium ions are diffused to a selected concentration within at least one of the first transition metal oxide or the second transition metal oxide;
    annealing the anneal precursor according to an anneal plan to cause the precursor layer to define the counter electrode comprising a diffusion of crystallites of the first transition metal oxide suspended in a field of lithiated second transition metal oxide;
    dispose a second metal oxide layer over the counter electrode; and
    etch at least one of the first metal oxide layer or the second metal oxide layer to define a switching region and a non-switching region of the counter electrode, wherein:
      the first transition metal oxide is nickel oxide; and
      the second transition metal oxide is tungsten oxide or tantalum oxide.

7. The method of claim 6, wherein the first metal oxide layer and the second metal oxide layer comprise indium tin oxide.

8. The method of claim 6, wherein forming the precursor layer is performed at least in part by a planetary deposition process in which the optically transparent substrate is rotated through at least a first deposition region in which the first transition metal oxide is disposed and a second deposition region in which the second transition metal oxide is disposed.

9. The method of claim 6, wherein the anneal plan comprises instructions for annealing the precursor layer at approximately 450° C. for a selected time period.

10. The method of claim 6, wherein the anneal plan comprises instructions for setting a temperature of the anneal precursor during deposition of the precursor layer.

11. The method of claim 6, wherein an average crystallite diameter of the diffusion of crystallites is approximately 5 nm.

12. The method of claim 6, wherein at least one of the first transition metal oxide or the second transition metal oxide are disposed by one of:

chemical vapor deposition;

sputtering; or evaporation.

26

13. The method of claim 6, wherein the second thickness is ranges between and including 20% and 200% of the third thickness.

14. A method of forming an anneal precursor stack to define a counter electrode of an electrochromic layer of an imaging system in a portable electronic device, the method comprising:

disposing a first metal oxide layer onto a surface of a substrate;

forming a precursor layer, to a first thickness, over the metal oxide layer by alternatingly disposing:

a second thickness of a first transition metal oxide over an uppermost layer of the precursor layer; and a third thickness of a second transition metal oxide over the uppermost layer of the precursor layer; and annealing the anneal precursor according to an anneal plan to cause the precursor layer to define the counter electrode comprising a diffusion of crystallites of the first transition metal oxide suspended in a lithiated material, wherein:

the first transition metal oxide is nickel oxide; and the second transition metal oxide is tungsten oxide or tantalum oxide.

* * * * *